United States Patent [19]

Lloyd

[11] Patent Number: 5,569,050
[45] Date of Patent: Oct. 29, 1996

[54] LOW-PROFILE, PIERCE-THROUGH CONNECTOR BACKSHELL

[75] Inventor: Brian K. Lloyd, Pflugerville, Tex.

[73] Assignee: W. L. Gore & Associates, Inc., Newark, Del.

[21] Appl. No.: 349,118

[22] Filed: Dec. 2, 1994

[51] Int. Cl.⁶ .................................................. H01R 13/58
[52] U.S. Cl. .................................................... 439/465
[58] Field of Search ................................. 439/465–467, 439/470, 492, 499, 404, 405, 77

[56] References Cited

U.S. PATENT DOCUMENTS

| | | | |
|---|---|---|---|
| 4,255,205 | 9/1980 | Sinclair et al. | 439/467 |
| 4,721,483 | 1/1988 | Dickie | 439/465 |
| 4,740,867 | 4/1988 | Roberts et al. | 439/499 |
| 5,057,650 | 10/1991 | Urushibata et al. | 439/465 |
| 5,234,358 | 8/1993 | Polgar | 439/465 |
| 5,277,617 | 1/1994 | Shasteen | 439/465 |

OTHER PUBLICATIONS

Design Parts for Ultrasonic Welding–Technical Information–Branson Ultrasonics Corporation, 1990 (Rev. Jul. 1989).

Primary Examiner—Gary F. Paumen
Attorney, Agent, or Firm—Victor M. Genco, Jr.

[57] ABSTRACT

A backshell housing and connector assembly are provided with strain relief in which the housing has a top and bottom shell with front and rear sections. Ledges with horizontal grooves disposed therein are located at the front sections of both shells. Piercing means are also provided on at least one ledge that pierces the web of jacket insulation when the housing is assembled. Energy directors are also provided that capture ultrasonic energy and cause welding of the two shells.

2 Claims, 4 Drawing Sheets

LOW-PROFILE, PIERCE-THROUGH CONNECTOR BACKSHELL

FIELD OF THE INVENTION

A low profile connector backshell is provided for flat ribbon cable having enhanced strain relief features without compromising the integrity of the cable.

BACKGROUND OF THE INVENTION

Strain relief devices protect the integrity of the connections made between a transmission cable and a connector. As a force is applied to the cable, the strain relief device provides resistance to the force thus preventing any destruction of the connection between the cable and the connector.

Many different types of strain relief devices have been tested and tried for various applications. Many of these devices include clamp mechanisms and potting compositions to hold the cables within the housing. Clamps have limited versatility and require additional parts be added to the housing. In addition, the clamps place large compressive loads on the cable potentially causing damage to the components. Similarly, potting compositions typically comprise an epoxy based material which is also added to the housing to cement the cable in place. Depending on the severe environment in which the cable may be placed, these potting compositions may deteriorate over time. The procedure of applying these potting compositions is also costly and time consuming.

Additionally, many of the existing strain relief devices require the cable to be routed along a tortuous path, often resulting in the housing of the device to be enlarged thus compromising the high density objectives and making installation difficult.

There is a need for a low-profile strain relieving backshell for flat cables that provides strain relief without damaging the components of the cable and is suitable for flat cables having an insulation jacket.

SUMMARY OF THE INVENTION

A backshell housing for use with a multi-position connector is provided having a top shell with front and rear sections, a bottom shell with front and rear sections, a ledge located in the rear section of the top shell having a plurality of longitudinal grooves for placement of cables and a second ledge on the bottom shell having matching grooves, at least one piercing means located between two longitudinal grooves on at least one ledge and means for locking the top shell to the bottom shell.

A connector assembly employing the inventive backshell is also provided.

DETAILED DESCRIPTION OF THE INVENTION

A low profile connector backshell is provided for a flat ribbon cable that has enhanced strain relief features. This connector backshell is suitable for use with any type of flat ribbon cable such as for example, electrical transmission cables, fiber optic signal lines, and a plurality of tubes used in the transmission of fluids.

Figure 1:
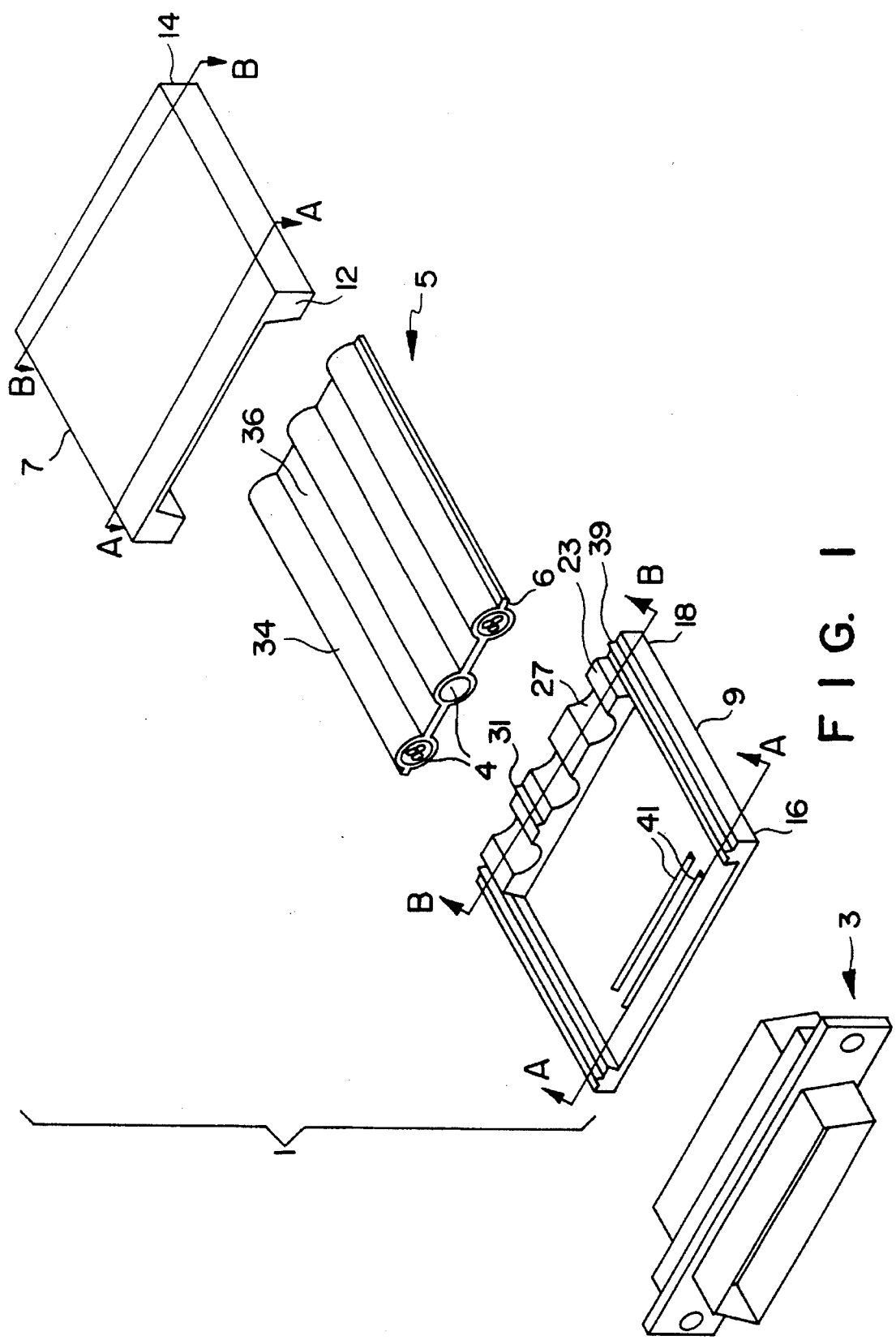
FIG. 1 is an exploded perspective view of the connector assembly with the low profile backshell.

Referring now in more detail to the drawings, an exploded perspective of the backshell housing 1 and connector 3 for flat ribbon cable 5 is shown in FIG. 1. The connector 3 is a multi-position electrical connector having a plurality of connector positions arranged along its face in order to connect to an object such as a printed circuit (PC) board. Alternatively, other connectors for example with optical fiber connections, tube connections, and connections for a combination of electrical conductors, fiber optics and tubes may be used. The connector may also be attached to other transmission systems besides PC boards.

The flat cable 5 comprises a plurality of adjacent cables 4 surrounded by at least one jacket of insulation 6. As noted above, the cables may be electrical transmission wires or conductors as shown in the accompanying figures or may be fiber optic cables or tubes holding fluids. In addition, the cable may comprise one single conductor, multiple conductors, or as shown in FIG. 1 a combination of single and multiple conductors. The area of the flat cable comprising the cable 4 is referred to as the pod 34 and the flat area of the flat cable located adjacent the pod is referred to as the web 36. The jacket of insulation may be made from any conventional insulation materials so long as it can be pierced and include such materials as for example, polyurethane, thermoplastic elastomers, polyvinylchloride, and polytetrafluoroethylene. A jacket made from expanded polytetrafluoroethylene commercially available from W. L. Gore & Associates of Newark, Del., sold under the trademark GORE-TEX® is most preferred.

Figure 4:
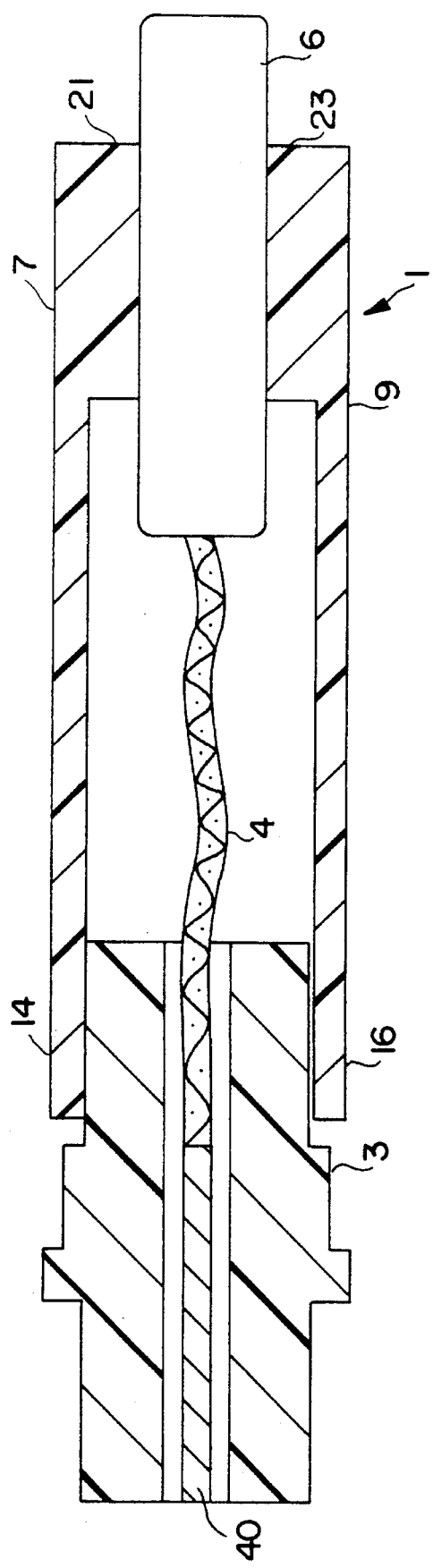
FIG. 4 is a cross-sectional view of the assembled connector and housing.

The backshell housing 1 includes a top shell 7 with a front section 12 and a rear section 14, and a bottom matching shell 9 likewise having a front section 16 and a rear section 18. The front sections 12, 16 of both shells 7, 9 fit together to form an opening through which the cables 4, stripped of their jacket are guided and terminated with the contacts of the adjoining connector 3 as shown in FIG. 4.

Figure 2A:
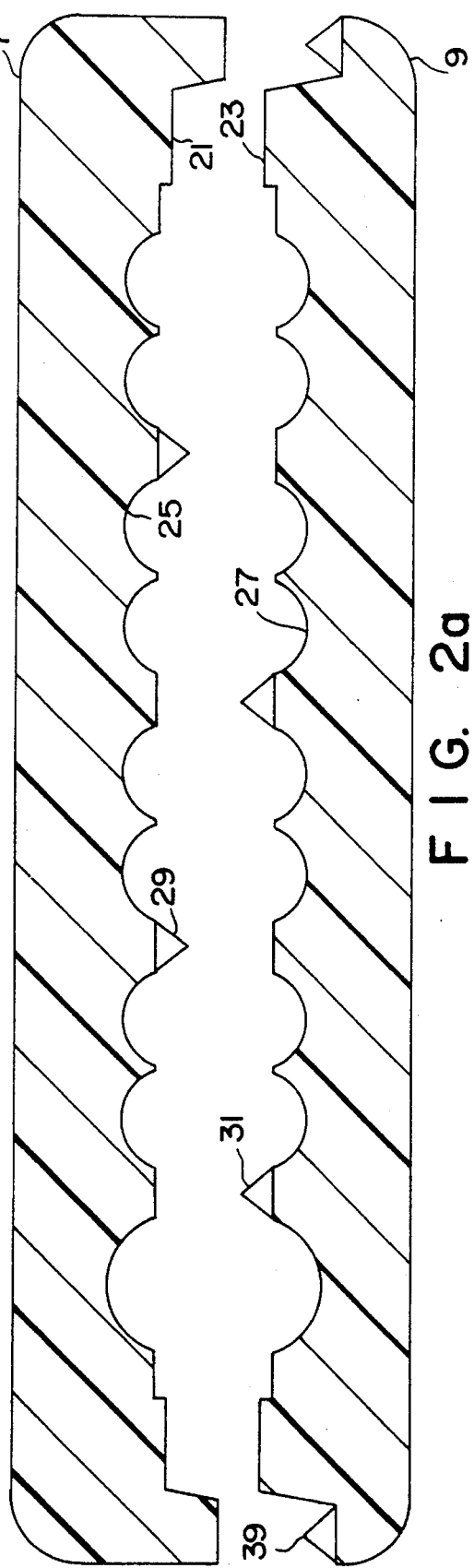
FIG. 2a is a cross-sectional view of the back of the disassembled low profile backshell at line B—B of FIG. 1.
Figure 3:
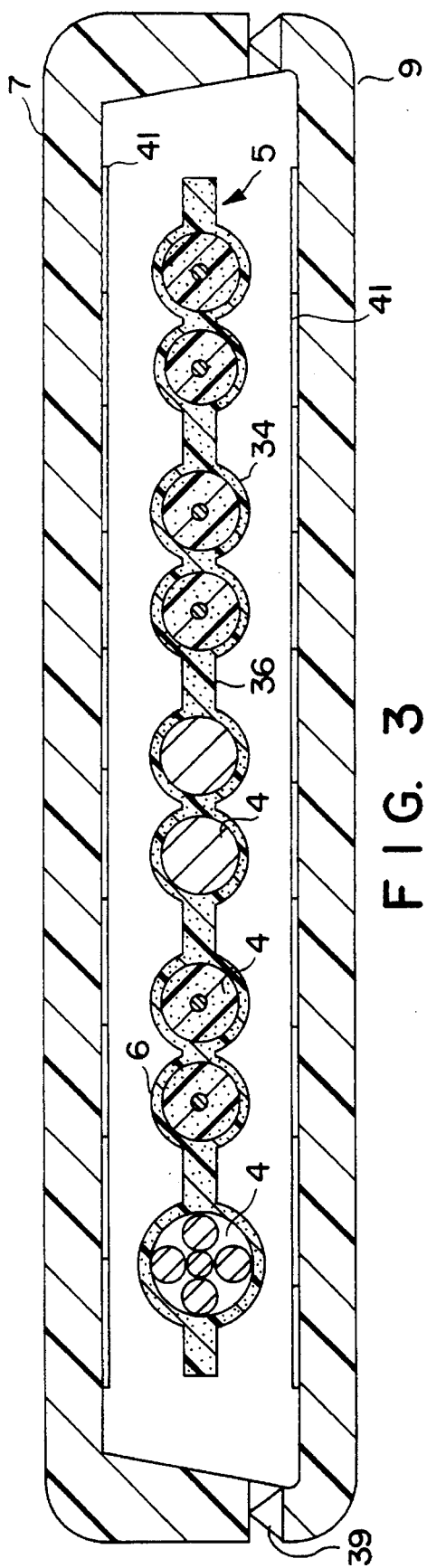
FIG. 3 is a front view of the assembled strain relief housing at line A—A.
Figure 3A:
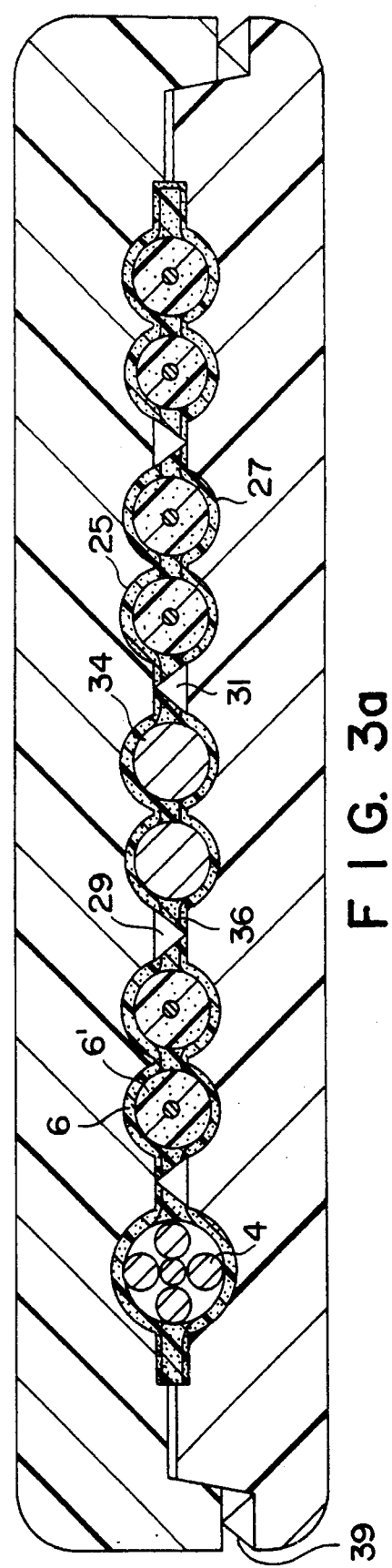
FIG. 3a is a back view of the assembled strain relief housing at line B—B.

The rear sections 14, 18 are further provided with matching ledges 21, 23 containing longitudinal grooves 25, 27 in which the pods 34 of the flat cable 5 are placed. Between adjacent grooves 25, 27 are piercing means 29, 31 located on either the upper or lower shells as shown further in FIGS. 2a and 3a which pierce through the web 36 of the flat cable when the shells are assembled. The piercing through the webs 36 is accomplished by application of pressure and ultrasonic vibration during the assembling of the device. The piercing means 29, 31 may be located on either shell sections and in any order. As such, FIGS. 2a and 3a show the piercing means 29, 31 located in alternative positions on the upper shell and lower shell. Alternatively, the location of the piercing means may all be located on one shell or the other. The piercing means 29, 31 are sharp edged protuberances of thermoplastic that extend from the ledge 21, 23 and located as described above at designated locations between longitudinal grooves 25, 27.

Figure 2:
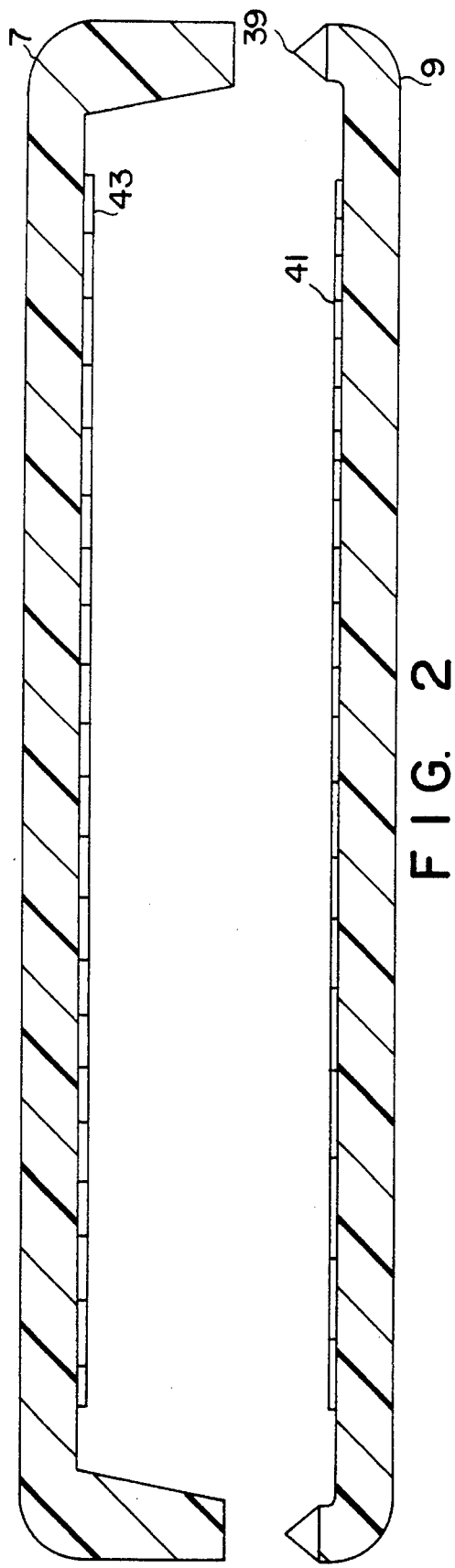
FIG. 2 is a cross-sectional view of the front of the disassembled low profile backshell at line A—A of FIG. 1.

A cross-section of the front view of the low profile housing along line A—A of FIG. 1 in its unassembled state is shown in FIG. 2. The flat cable 5 enters through this region and extends to reach the connector. The opening of this front area is essentially rectangular to facilitate the entry and placement of the flat cable. Also shown in FIG. 2 are the means of attaching the top shell 7 to the bottom shell 9. In the embodiment shown, the means of attaching or locking 39 include energy directors which are projections which absorb ultrasonic energy and subsequently melt so as to weld the top shell to the bottom shell forming a rigid housing. Alternative means of attaching or locking the top shell to the bottom shell include for example adhesives, screws, clamps, snaps and other locking means.

Finally, second attachment means also identified as means for rigidly affixing the backshell 1 housing to the connector 3 are also provided. FIG. 2 shows this affixing means as energy directors which provide a rigid attachment between the backshell 1 and connector 3. Here again, when affixing means are energy directors, ultrasonic energy is absorbed by these projections causing them to melt and rigidly affix to the connector 3. Although the embodiment of FIGS. 1–3 show the second means of attachment as two parallel extended rows of energy directors 41, a plurality of shorter energy directors positioned in two or three parallel rows may also be suitable. Alternative means of rigidly affixing the backshell to the connector include for example, use of adhesives, screws, clamps, and snaps.

FIG. 2a shows a cross-section of the back end of the disassembled low profile backshell at line B—B of FIG. 1. Here, the ledges 21, 23 containing grooves 25, 27 are formed. The individual grooves 25, 27 may be of different radial dimension so as to fit the different type of electrical cable, optic wire or tubing that will reside within the groove. Also shown in FIG. 2a are the piercing means 29, 31 that pierce through the web of the flat cable when assembled.

The individual shells 7, 9 of the backshell housing 1 are preferably molded from a thermoplastic material such as glass filled nylon, glass filled polyester, and other rigid thermoplastics which are conventionally used for such housing units. As described above, the shell parts are attached to each other with the use of energy directors, adhesives, snaps, or other locking means.

The energy directors are raised triangular beads of thermoplastic material molded onto the edge surfaces of one of the shell parts that is joined to the other. After assembly with the cable and connector, the two shell parts are placed together and ultrasonic energy is applied. The ultrasonic energy generates heat which is concentrated in the energy directors 39 and causes the thermoplastic to melt at the mating surfaces. The melted thermoplastic solidifies when the ultrasonic energy is removed thereby forming a weld. The ultrasonic energy equipment is commercially available from Branson Ultrasonics Corporation of Danbury, Conn.

FIGS. 3 and 3a shows the assembled cable and connector again at lines A—A and B—B of FIG. 1 respectively. FIG. 3 shows the front of the assembly wherein the cable 5 extends to be connected to the connector. As shown in FIG. 3, the flat cable may comprise a plurality of different types of individual conductors such as a plurality of smaller wires comprising a pod 34 or a conductor with several layers of insulation surrounding it or a single large conductor with the single jacket of insulation.

FIG. 3a shows the rear of the assembly in which the pods 34 reside within grooves 25, 27 and piercing means 29, 31 penetrate through the web 36 of insulation jacket 6.

When fully assembled, as shown in FIG. 4, the individual conductors 4 of the flat cable are first stripped of any insulative jackets 6 and soldered, crimped or otherwise terminated to the contacts 40 of the connector 3. The exposed area of the conductors 4 and contacts 40 may optionally be covered with an isolating material such as Kapton®, a polypyromelitimide, commercially available from E. I. DuPont de Nemours, Inc., of Wilmington, Del. The shells 7 and 9 are then positioned to surround the contact area of the connector and cables as well as the sheath such that the front sections 14, 16 of the shell 7, 9 are in contact with the connector 3, and the rear section 14, 18 with longitudinal grooves 25, 27 located on the ledges 21, 23 hold the insulated flat cable pods 34. The piercing means 29, 31 pierce through the webs of the cable 36 so as to meet the opposing surface of the ledge of the mating shell (shown in FIG. 3a).

As described above, a first means of attaching the two shell parts together are provided to create a rigid housing. A second means of attaching are also provided to ensure a rigid attachment between the backshell and the connector.

While a preferred embodiment of the invention has been described in detail, it is to be understood that changes and variations may be made without departing from the spirit or scope of the following claims.

What is claimed is:

1. A backshell housing for use with a multi-position connector and a flat cable, the backshell housing comprising:

a. a top shell having a front section and a rear section;

b. a bottom shell having a front section and a rear section, said front sections of the top and bottom shells defining a substantially (rectangular opening) for facilitating the entry and placement of the flat cable within the backshell;

c. a first ledge located in the rear section of the top shell having a plurality of longitudinal grooves for placement of a plurality of cables of the flat cable;

d. a second ledge located in the rear section of the bottom shell having a plurality of longitudinal grooves, said grooves being in the same position as the grooves of the top shell so that when the top shell and bottom shell are assembled, openings for said cables are created between the longitudinal grooves;

e. at least one piercing means for piercing a web of the flat cable located between two longitudinal grooves on at least one said ledge, said piercing means piercing the web by application of both pressure and ultrasonic vibration;

f. means for locking the top shell to the bottom shell the locking means comprising at least first and second energy directors formed as raised heads and disposed on lateral edge surfaces of one of the top or bottom shells, whereupon application of ultrasonic energy, said locking means welds the top shell to the bottom shell to form a rigid, unitary backshell housing; and (means for rigidly affixing the housing to the multi-position connector), said means comprising at least one energy director 41 found or a raised bead and disposed on an interior surface of each of the top and bottom shells, said means being operable to absorb ultrasonic energy and to melt and rigidly affix to the multi-position connector.

2. An electrical connector assembly comprising:

a. a multi-position connector having a plurality of contact positions;

b. a flat cable comprising a plurality of cables surrounded by at least one jacket of insulation, wherein individual cables are further identified as pods, and jacket areas located between adjacent cables are identified as webs, and further, the cables have ends which are capable of being terminated to contact positions of the multi-position connector; and c. a backshell housing comprising:
   i) a top shell having a front section and a rear section;
   ii) a bottom shell having a front section and a rear section wherein the two shells are positioned so that the front sections are paired to form a substantially rectangular opening to receive the flat cable;
   iii) a first ledge located in the rear section of the top shell having a plurality of longitudinal grooves;
   iv) a second ledge located in the rear section of the bottom shell having a plurality of longitudinal grooves, said grooves being in the same position as the grooves of the top shell so that when the top shell and bottom shell are assembled, openings for said cables are created between the longitudinal grooves;
   v) at least one piercing means (for) piercing a web of the flat cable located between two longitudinal grooves on at least one of the first and second ledges, said piercing means piercing the web by application of both pressure and ultrasonic vibration;
   vi) means for locking the top shell to the bottom shell, the locking means comprising at least first and second energy directors formed as raised beads and disposed on lateral edge surfaces of one of the top or bottom shells, whereupon application of ultrasonic energy said locking means welds the top shell to the bottom shell to form a rigid, unitary backshell housing; and
   vii) means for rigidly affixing the backshell housing to the multi-position connector, said means comprising at least one energy directors disposed on an interior surface of both the top and bottom shells, said means being operable to absorb ultrasonic energy and to melt and rigidly affix to the multi-position connector.

\* \* \* \* \*